(12) United States Patent
Urano et al.

(10) Patent No.: US 7,276,116 B2
(45) Date of Patent: Oct. 2, 2007

(54) LIME-BASED PLASTERING MATERIAL COMPOSITIONS

(75) Inventors: Teruo Urano, Tochigi (JP); Sachio Ina, Tochigi (JP)

(73) Assignee: Murakashi Lime Industrial Co., Ltd., Tochigi (JP)

( * ) Notice: Subject to any disclaimer, the term of this patent is extended or adjusted under 35 U.S.C. 154(b) by 239 days.

(21) Appl. No.: 10/530,230

(22) PCT Filed: Apr. 14, 2003

(86) PCT No.: PCT/JP03/04711

§ 371 (c)(1),
(2), (4) Date: Sep. 26, 2005

(87) PCT Pub. No.: WO2004/031098

PCT Pub. Date: Apr. 15, 2004

(65) Prior Publication Data

US 2006/0096502 A1  May 11, 2006

(30) Foreign Application Priority Data

Oct. 4, 2002  (JP) .............................. 2002-291870

(51) Int. Cl.
 C04B 2/04 (2006.01)
 C04B 2/06 (2006.01)
(52) U.S. Cl. ..................................... 106/795
(58) Field of Classification Search ............ 106/795
 See application file for complete search history.

(56) References Cited

FOREIGN PATENT DOCUMENTS

| GB | 2 293 821 A | 4/1996 |
|---|---|---|
| JP | 8-081250 A | 3/1996 |
| JP | 8-109053 A | 4/1996 |

OTHER PUBLICATIONS

Introduction to Carrageenan, www.cybercolloids.net/library/carrageenan/structure.php, (Jun. 2007).*

* cited by examiner

*Primary Examiner*—David M Brunsman
(74) *Attorney, Agent, or Firm*—Weingarten, Schurgin, Gagnebin & Lebovici LLP

(57) ABSTRACT

A slaked lime-based coating material composition which gives a consideration to sick house syndrome is a powdery composition obtained by mixing either calcium hydroxide or a calcium hydroxide/magnesium hydroxide mixture with one or more carrageenans comprising a six-membered-ring galactose skeleton and bonded thereto in equatorial conformation a sulfate group($-OSO_3^-$) and a hydroxyl group($-OH$) and which is kneaded together with water at time of use, or a slaked lime-based plastering material composition which gives a consideration to sick house syndrome is a pasty slaked lime-based coating material composition obtained by mixing either calcium hydroxide or a calcium hydroxide/magnesium hydroxide mixture with one or more carrageenans comprising a six-membered-ring galactose skeleton and bonded thereto in equatorial conformation a sulfate group($-OSO_3^-$) and a hydroxyl group($-OH$), and which is kneaded together with water in advance.

14 Claims, No Drawings

LIME-BASED PLASTERING MATERIAL COMPOSITIONS

This application is a 371 national phase filing of PCT/JP2003/004711 filed Apr. 14, 2003, and claims priority to a Japanese application No. 2002-291870 filed Oct. 4, 2002.

TECHNICAL FIELD

The present invention relates to a plastering material composition which is a mixture of calcium hydroxide or a calcium hydroxide/magnesium hydroxide (hereinafter, slaked lime-based), which gives consideration on sick house syndrome, and which improves adhesive properties to bases, workability, and water resistive properties.

BACKGROUND ART

A slaked lime-based plaster material or a plaster is made by kneading the slaked lime adding fibers of seaweeds such as red seaweeds (Rhodophyts), Chondrus, Gigartina, Iridaea and the like as a putty with water, and is a building material applied for wall, roof, and fence and the like by using trowel since ancient times.

Specific seaweeds in the natural seaweeds such as red seaweeds (Rhodophyts), Chondrus, Gigartina, Iridaea which are used for putty materials, are added to slaked lime after dissolved with hot-water and kneaded with added water, then the seaweeds make slaked lime putty spread and improve workability, and after coating, fix carbon dioxide gas in the air, and cure while producing calcium carbonate so that performances such as adhesive properties to bases, surface hardness, cracking resistance, and water resistive properties are made to improve.

Also, recently the ready-mixed type which is prepared by the previous compounding of the base material, putty material, and fibers and the like is preferably used, in considering to the labor cost saving, efficiency of work, and stability of quality in a construction site. In these circumstances, as putty material, powdered red seaweeds which are prepared by the above mentioned seaweeds which are boiled, dried and powdered, or water soluble powdered materials such as methyl cellulose or cellulose derivatives are applied. Without gelating in the alkaline region, these materials provide effectiveness to the adhesive properties to bases, water holding, viscosity control, workability, and reinforcement of surface hardness with a small quantity of addition.

Meanwhile, since the present living environment pursues labor and cost savings, ply wood, paper wall and resin based painting are frequently applied. As a result, volatile organic solvents including formaldehyde generate a cause of sick house syndrome by vaporizing in rooms.

Under such circumstances, natural building materials and inorganic-based materials are reviewed. Especially, since plasters and the like can provide specific massive feeling and posh feeling by thick-coating and three-dimensional pattern finishing, a various expression of designs are possible and additionally since plasters have environmental purification functions such as air clean-up properties, humidity conditioning properties, mildew resistive properties and the like, they are regarded as building materials of "symbiosis housing".

However, the above mentioned natural seaweeds that can not be used directly, are applied after dissolved in water, and because of insolubility in cold water, after being dissolved by boiling to remove insoluble materials, then they are added to a slaked lime-based and the slake lime-based putty having adequate workability and viscosity is obtained by adjusting blend water quantity. Moreover, by reason of a large quantity of impurities even after boiling, problems remain such as low level solubility, removal of insoluble portion, peculiar strong odor, and incapability of storage by perishability.

Also, since powdered red seaweeds which are made from the natural seaweeds by drying and powdering, contain a large quantity of impurities, water solubility is in low level, and when powdered red seaweeds are compared with the case of red seaweeds putty extracted by hot-water, the effect is difficult to be revealed.

Meanwhile, water soluble powder materials such as methyl cellulose and cellulose derivatives are superior in water holding and viscosity control properties of slaked lime-based putty but by reason of excessive high stickiness properties, trowel release properties become inferior when coating by trowel work and flat coating with uniform thickness is difficult. Moreover, after coating, since there are disadvantages such as water resistive properties of cured material, for example, occurrence of de-lamination and cracking with base surfaces, by a repeat of wet by rain and dry, water soluble powder materials are faced with problems compared with the natural seaweeds.

The object of the present invention is to provide plastering compositions furnished for the performances for slake lime-based plaster materials.

DISCLOSURE OF INVENTION

To be more precise, the present invention relates to a slaked lime-based plastering material composition, comprising a powdery composition obtained by mixing either calcium hydroxide or a mixture of calcium hydroxide and magnesium hydroxide with one or more carrageenans having a six-membered-ring galactose skeleton and bonded thereto in equatorial conformation a sulfate group($-OSO_3^-$) and a hydroxyl group($-OH$), and kneading together with water at time of use.

The present invention relates to a slaked lime-based plastering material composition, comprising a powdery composition obtained by mixing either calcium hydroxide or a mixture of calcium hydroxide and magnesium hydroxide with one or more carrageenans having a six-membered-ring galactose skeleton and bonded thereto in equatorial conformation a sulfate group($-OSO_3^-$) and a hydroxyl group($-OH$), and kneading together with water in advance as a putty state.

The present invention relates to the slaked lime-based plastering material composition according to claim 1 or 2, wherein the carrageenan having a six-membered-ring galactose skeleton and bonded thereto in equatorial conformation a sulfate group($-OSO_3^-$) and a hydroxyl group($-OH$), is lambda($\lambda$) carrageenan, mu($\mu$) carrageenan, nu($\nu$) carrageenan, xi($\xi$) carrageenan, pi($\pi$) carrageenan, and theta($\theta$) carrageenan.

The present invention relates to the slaked lime-based plastering material composition according to any one of claims 1, 2, and 3, wherein the prescribed carrageenan of 0.1 to 5.0 parts by weight is added to the calcium hydroxide or the mixture of calcium hydroxide and magnesium hydroxide of 100 parts by weight.

The present invention relates to the slaked lime-based plastering material composition according to any one of claims 1, 2, 3, and 4, wherein the slaked lime is applied for calcium hydroxide and dolomite plaster or hydrated dolomitic lime is applied for the mixture of calcium hydroxide and magnesium hydroxide.

The present invention relates to the slaked lime-based plastering material composition according to any one of claims 1, 2, 3, 4, and 5, wherein at least one material which is selected from hydraulic composition, plaster admixture agent, or aggregate is compounded.

The present invention comprises the slaked lime-based plastering material composition according to any one of claims 1, 2, 3, 4, 5, and 6 which is used as a plaster material.

As mentioned above, a slaked lime-based plastering material composition according to the present invention, is a powdery composition obtained by mixing either calcium hydroxide or a calcium hydroxide/magnesium hydroxide mixture with one or more carrageenans comprising a six-membered-ring galactose skeleton and bonded thereto in equatorial conformation a sulfate group($-OSO_3^-$) and a hydroxyl group($-OH$), and is kneaded together with water at time of use, or is a pasty composition obtained by mixing either calcium hydroxide or a calcium hydroxide/magnesium hydroxide mixture with one or more carrageenans comprising a six-membered-ring galactose skeleton and bonded thereto in equatorial conformation a sulfate group ($-OSO_3^-$) and a hydroxyl group($-OH$), and is kneaded with water in advance.

Lambda($\lambda$) carrageenan, mu($\mu$) carrageenan, nu($\nu$) carrageenan, xi ($\xi$) carrageenan, pi($\pi$) carrageenan, or theta($\theta$) carrageenan is named as carrageenans comprising a six-membered-ring galactose skeleton and bonded thereto in equatorial conformation a sulfate group($-OSO_3^-$) and a hydroxyl group($-OH$).

Carrageenan is water soluble natural polysaccharide which is extracted and purified from natural seaweeds such as red seaweeds, and which has molecular weight of approximately $10^5$ comprising galacto sulfuric acid ester as the major component. Kappa ($\kappa$) carrageenan, iota($\iota$) carrageenan, lambda($\lambda$) carrageenan, mu($\mu$) carrageenan, nu($\nu$) carrageenan, xi($\xi$) carrageenan, and pi($\pi$) carrageenan are known depending on the difference of the molecular structure. Besides, theta($\theta$) carrageenan which is obtained by alkaline treatment of lambda($\lambda$) carrageenan and which is not existed in nature, is known. Kappa ($\kappa$) carrageenan, iota($\iota$) carrageenan, and lambda($\lambda$) carrageenan which are existed in a large quantity are commercially important while others are known only their existences. The structures of the eight kinds of carrageenans are shown in Formula 1 described below. (Reference: Naomichi Kunizaki, Masao Sano: Food Polysaccharide—Knowledge of Emulsification, Thickening, Gelation, First Edition, Saiwai Shobou Co., Ltd., Nov. $25^{th}$, 2001, p.100.)

[Formula 1]

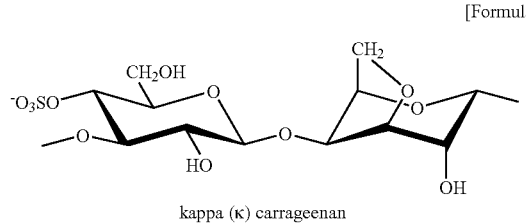

kappa ($\kappa$) carrageenan

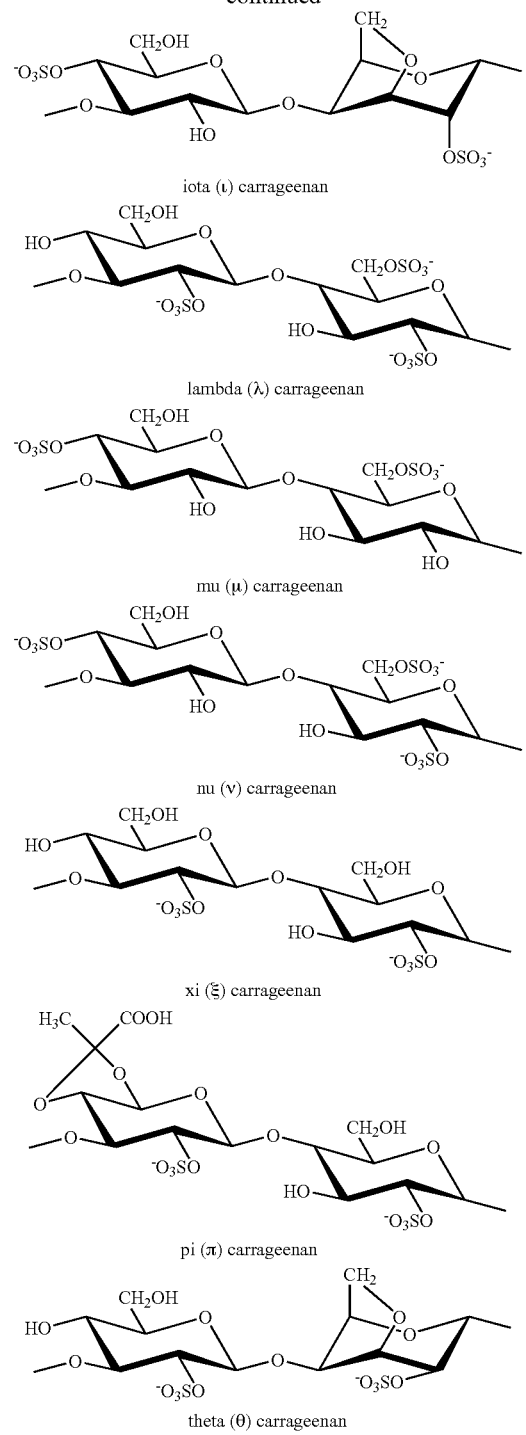

Carrageenans have structures where $\beta$-1,4 bond and $\alpha$-1,3 bond in $\beta$-D-galactose and $\alpha$-D-galactose are alternately repeated. The structural differences of each type are classified by a six-membered-ring galactose skeleton structure and the three dimensional conformations of a sulfate group($-OSO_3^-$) and a hydroxyl group($-OH$) existing in galactose skeleton.

The six-membered-ring structures which galactose skeleton in the carrageenan structure can take as the forms are Chair type (C type as abbreviated expression), Boat type (B type as abbreviated expression), Twist-boat or Skew-boat type (S type as abbreviated expression), and Half-chair type (H type as abbreviated expression), and all the carrageenans take C type. The diagrammatic representations are shown in the following Formula 2. (Reference: Naomichi Kunizaki, Masao Sano: Food Polysaccharide —Knowledge of Emulsification, Thickening, Gelation, First Edition, Saiwai Shobou Co., Ltd., Nov. 25$^{th}$, 2001, p.105.)

[Formula 2]

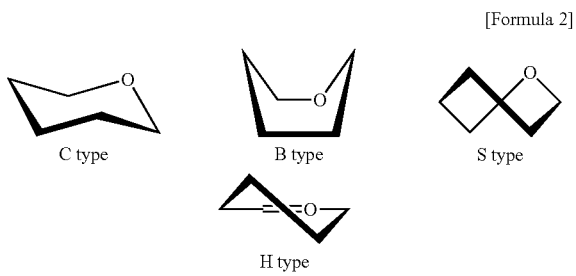

As shown in Formula 3 (Reference: Naomichi Kunizaki, Masao Sano: Food Polysaccharide—Knowledge of Emulsification, Thickening, Gelation, First Edition, Saiwai Shobou Co., Ltd., Nov. 25$^{th}$, 2001, p.105.), the two different types exist for C type, namely, C1 type (or shown as $^4C_1$type which expresses C-1 site and C-4 site of up and down of carbon atom) and 1C type (or shown as $_4C^1$type which expresses C-1 site and C-4 site of up and down of carbon atom).

[Formula 3]

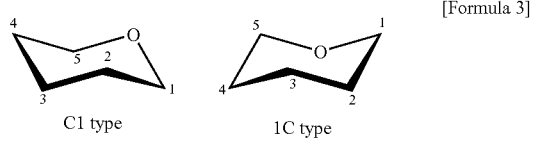

The carrageenan is shown that the six-membered-ring structures of β-D-galactose and α-D-galactose are in combination of C1 type with C1 type, and in combination of C1 type with 1C type.

The equatorial conformation and axial conformation are in three dimensional conformation of a sulfate group(—$OSO_3^-$) and a hydroxyl group(—OH) existing in galactose skeleton where the equatorial conformation is defined that sulfate group(—$OSO_3^-$) and hydroxyl group(—OH) protrude to horizontal direction of the same flat surface of the galactose six-membered-ring skeleton, and this is defined as equatorial conformation (The equatorial means "the equator direction".). Also, the axial conformation is defined that the functional groups protrude the upper and lower side directions of the galactose six-membered-ring skeleton, and this is defined as axial conformation (The axial means "axial direction".).

Solutions of kappa (κ) carrageenan and iota(ι)carrageenan gelate with metal ion while lambda (λ) carrageenan, mu(μ) carrageenan, nu(ν) carrageenan, xi (ξ) carrageenan, and pi(π) carrageenan and theta(θ) carrageenan do not gelate but show spread properties. The difference between the two is caused by the three dimensional conformation of a sulfate group(—$OSO_3^-$) and a hydroxyl group(—OH) existing in galactose skeleton. Also, all the types of carrageenans have the negative electrical charge in all pH range and show electrostatic interaction with metal ion.

To be more precise, gelations of kappa (κ) carrageenan and iota(ι)carrageenan solutions are caused by cross-linking reactions of the sulfate group(—$OSO_3^-$) in the carrageenan structure with metal ion. Kappa (κ) carrageenan as the typical structural formula is shown in Formula 4 (Reference: Naomichi Kunizaki, Masao Sano: Food Polysaccharide —Knowledge of Emulsification, Thickening, Gelation, First Edition, Saiwai Shobou Co., Ltd., Nov. 25$^{th}$, 2001, p.106.)
The left side in Formula 4 is β-D-galactose unit where the six-membered-ring structure is C1 type ($^4C_1$type) and the three dimensional conformation of the functional groups is equatorial conformation. And the right side is α-D-galactose unit where the six-membered-ring structure is 1C type ($_4C^1$type) and the three dimensional conformation of the functional groups is axial conformation. The kappa (κ) carrageenan constitutes polymer where β-D-galactose and α-D-galactose are in β-1,4 combination, and α-1,3 combination.

[Formula 4]

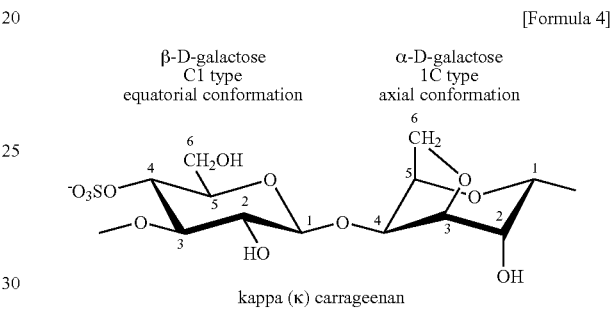

As for kappa (κ) carrageenan, hydroxyl group(—OH) of C-2 site having the conformation in α-D-galactose unit to the right side protrudes to the upper and lower directions of the six-membered-ring galactose skeleton with axial conformation. Accordingly, the mutual interaction between molecules is strong, and macromolecule chains of kappa (κ) carrageenan stabilize with mutual entanglement and form spiral structure. Therefore, when metal ion exists, aqueous solution gelates by associating macromolecule chain of kappa (κ) carrageenan and by cross-linking to construct three dimensional network structure.

Meanwhile, each six-membered-ring galactose skeleton of lambda (λ) carrageenan, mu(μ) carrageenan, nu(ν) carrageenan, xi (ξ) carrageenan, and pi(π) carrageenan is constituted only by C1 type ($^4C_1$type) and three dimensional conformation of the function groups are equatorial conformation.

Lambda (λ) carrageenan as the typical structural formula is shown in Formula 5 (Reference: Naomichi Kunizaki, Masao Sano: Food Polysaccharide—Knowledge of Emulsification, Thickening, Gelation, First Edition, Saiwai Shobou Co., Ltd., Nov. 25$^{th}$, 2001, p.103.)

In Formula the left side is β-D-galactose unit and the right side is α-D-galactose unit where both of six-membered-ring structures are only C1 type ($^4C_1$type) in β-D-galactose unit as well as α-D-galactose unit, and three dimensional conformation of the function groups are equatorial conformation.

β-D-galactose unit of lambda (λ) carrageenan has sulfate group(—$OSO_3^-$) in C-2 site, and hydroxyl group(—OH) in C-4 and C-6 while α-D-galactose has sulfate group(—$OSO_3^-$) in C-2 site and C-6 site and hydroxyl group(—OH) in C-3 site and both of the three dimensional conformations are the equatorial conformation.

To be more precise, a sulfate group and a hydroxyl group which are formed equatorial conformation to the six-membered-ring skeleton protrude to the horizontal directions of the same flat surface of the six-membered-ring and stabilize by mutual repulsion so that mutual interaction is weak and no spiral structure forms. Accordingly, the aqueous solution does not generate cross-linking reaction with metal ion and show thickening properties without gelation. By the same reason regarding other mu(μ)carrageenan, nu(ν) carrageenan, xi (ξ) carrageenan, and pi(π) carrageenan the aqueous solutions do not gelate by metal ion.

[Formula 5]

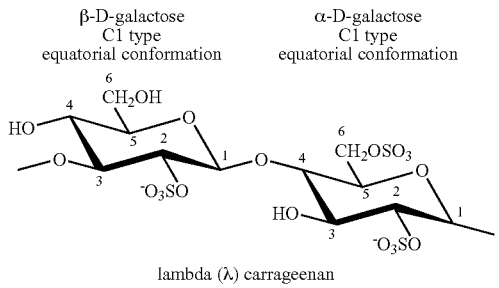

lambda (λ) carrageenan

Then, theta(θ) carrageenan structural formula is shown in Formula 6 (Reference: Naomichi Kunizaki, Masao Sano: Food Polysaccharide—Knowledge of Emulsification, Thickening, Gelation, First Edition, Saiwai Shobou Co., Ltd., Nov. 25$^{th}$, 2001, p.103.).

The theta(θ) carrageenan is as same in kappa (κ) carrageenan and iota (ι) carrageenan, in Formula, where the left side is β-D-galactose unit with six-membered-ring in C1 type($^4C_1$type), and the right side is α-D-galactose unit of six-membered-ring structure in 1C type($_4C_1$type), and both of the three dimensional conformation of the function groups are equatorial conformation.

To be more precise, β-D-galactose unit of theta(θ) carrageenan has the sulfate group in C-2 site, and the hydroxyl group in C-4 and C-6 while α-D-galactose unit has the sulfate group in C-2 site and C-6 site and both of the three dimensional conformations are equatorial conformation.

To be more precise, the sulfate group and the hydroxyl group which are formed equatorial conformation to the six-membered-ring skeleton protrude to the horizontal directions of the same flat surface of the six-membered-ring and stabilize by mutual repulsion so that mutual interaction is weak and no spiral structure forms. Accordingly, the aqueous solution does not generate cross-linking reaction with metal ion and shows thickening properties without gelation.

[Formula 6]

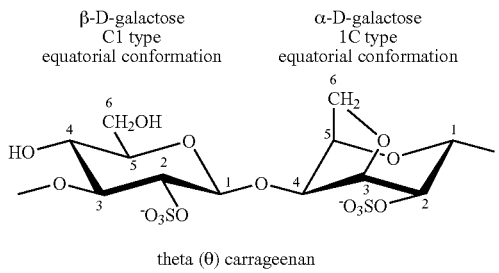

theta (θ) carrageenan

The carrageenan is known to be contained a large quantity in red seaweeds, especially in Chondrus (for example: Chondrus crispus, Chondrus ocellatus); Eucheuma (for example: Gigartina stellata, Gigartina acicularis, Gigartina pistillata, Gigartina radula); Gigartina (for example: Eucheuma spinosum, Eucheuma cottoni); Iridophycus (for example: Iridaea); Hypnea (for example: Hypnea musciformis); Ahnfeltia (for example: Ahnfeltia concinna); Gymnogongrus (Ahnfeltiopsis).

The carrageenan contents in the seaweeds vary with picking point and gathering season, and for example, it is reported that Chondrus crispus of Chondrus contains kappa (κ) carrageenan of 12 to 33%, lambda (λ) carrageenan of 7 to 21%, and a small quantity of other carrageenans as mu(μ) carrageenan, iota (ι) carrageenan, and nu(ν) carrageenan; Gigartina stellata of Gigartina contains kappa (κ) carrageenan of around 15%, lambda (λ) carrageenan of around 12%, and a small quantity of other carrageenans as mu(μ) carrageenan, iota (ι) carrageenan, and nu(ν) carrageenan ; Gigartina acicularis contains kappa (κ) carrageenan of around 4%, lambda (λ) carrageenan of around 30%, and a small quantity of other carrageenans as mu(μ) carrageenan ; Gigartina pistillata contains kappa (κ) carrageenan of around 8%, lambda (λ) carrageenan around 30%, and small quantity of other carrageenans as mu(μ) carrageenan; Gigartina radula contains kappa (κ) carrageenan of around 28%, lambda (λ) carrageenan of around 8%, and a small quantity of other carrageenans as mu (μ) carrageenan ; Eucheuma spinosum contains mainly iota (ι) carrageenan and a small quantity of nu(ν) carrageenan; Eucheuma cottoni contains mainly kappa (κ) carrageenan and mu(μ) carrageenan; and it is known that many types of carrageenans are contained in natural seaweeds and carrageenans(kappa and iota) which are not preferable for putty of slaked lime-based plaster material having the gelation performance.

As for the general production method of carrageenans, an extraction is conducted with immersing in hot water after the above mentioned seaweeds are washed. At this time, alkaline is added in order to raise the extraction effect, and by the use of filter aid and the like, a filtration is conducted to obtain carrageenan solution. After the solution is concentrated, by separating gelated insoluble contents by means of the method of alcohol precipitation by addition of alcohol, or of the method of the sodium ion pressure dehydration method (gel press method) by the addition of metal ion, carrageenans which gelate such as kappa (κ) carrageenan and iota (ι) carrageenan and carrageenans which do not gelate such as lambda (λ) carrageenan, mu(μ) carrageenan, nu(μ) carrageenan, xi (ξ) carrageenan, and pi(π) carrageenan, are separated.

For food additves the powdered materials are used depending on the purpose. Theta (θ) carrageenan is obtained by an alkaline treatment of lambda (λ) carrageenan.

The carrageenans are important for the raw material of food putty, and have wide area of application and long history as congealed food and soup cooking, and also, as food-industrial-purpose emulsifiers and stabilization agents for ham, sausage, ice cream, pudding, yogurt, oleomargarine, jam, and canned foods and the like.

As the carrageenans applied for the present invention, lambda (λ) carrageenan, mu(μ) carrageenan, nu(ν) carrageenan, xi (ξ) carrageenan, pi(π) carrageenan and theta (θ) carrageenan, which do not gelate by metal ion are selected, and the carrageenans which are obtained by the previously described general production methods can be used and the both for food application and industrial application can be used.

Also, lambda (λ) carrageenan, mu(μ) carrageenan, nu(ν) carrageenan, xi (ξ) carrageenan, pi(π) carrageenan and theta (θ) carrageenan provide the same effect by the use of independently or of the blend of more than two kinds of carrageenans.

Especially, lambda (λ) carrageenan is desirable to use, because of existing a large quantity and dealing commercially active.

The slaked lime which contains calcium hydroxide as the major component and dolomite plaster which is made from calcium hydroxide/magnesium hydroxide are given as the slaked lime-based which is used in the present invention.

Dolomite plaster (hydrated dolomitic plaster) is specified in Japanese Industrial Standards (JIS) A 6903. To be more precise, after dolomite is calcined to make calcium oxide and magnesium oxide, which are slaked to be calcium hydroxide and magnesium hydroxide thoroughly, then ground by ball mill and the like, and classified by air separator.

For the slaked lime-base compound, (JIS) A6902 slaked lime for plasterer, (JIS) A6903 dolomite plaster are desirable and industrial slaked lime and also, hydrated dolomitic lime (major components; calcium hydroxide, magnesium hydroxide) can be applied.

For the slaked lime-based plastering material compositions of the present invention, the known hydraulic compounds can be added according to need. For said hydraulic compounds, gypsum, Portland cement, early-strength Portland cement, alumina cement, blast furnace slug, fly ash cement, colored cement and the like can be listed.

Also, as plaster admixtures, cellulose derivatives such as methyl cellulose, ethyl cellulose, hydroxypropyl cellulose, hydroxyethyl cellulose, hydroxyethyl methyl cellulose, hydroxypropyl methyl cellulose; water soluble polymer such as polyvinyl alcohole and polyacrylamide; acrylic based polymer emulsion ; vinyl acetate polymer emulsion ; ethylene-vinyl acetate based polymer emulsion; SBR based polymer emulsion; epoxy resin emulsion; can be added.

Also as aggregates, river sand, pit sand, silica sand, crushed lime stone, light weight aggregate and the like, plant fibers(hemp fibers for plastering, jute fibers for plastering, Manila fiber, Japanese paper, hemp palm, wooden pulp, kenaf), inorganic fibers (rock wool, glass fiber and the like), and organic fiber (polyamide fiber, polyester fiber, polypropylene fiber, vinylon fiber, carbon fiber and the like) and the like can be compounded.

The additive level of the carrageenans applied to the present invention can be determined as the sufficient amount to give the desired physical properties for the plaster materials and generally the range of 0.1 to 5.0 weight parts in 100 weight parts of slaked lime-based are used. In case that the amount used is 0.1 weight parts or less, insufficient water holding characteristics of slaked lime-based putty is generated, and occasionally workability improvement cannot be expected. Also, the case that the amount used is in excessive of 5.0 weight parts is not desirable since adhesive strength decreases, and the increase of mixing water amount causes significant dry shrinkage and generates shrinkage crack in plastering surface.

The mixing machine for slaked lime-based with carrageenan applied to the present invention is recommended to the machine which can mix and agitate both materials uniformly, and any kind of machines can be applied.

The plastering materials compositions of the present invention, when in use, are mixed well by the addition of water, and applied after making adequate putty state for work. Also, the plastering materials compositions, which can be held for a long period of time in the stable state of putty under alkaline state resulting from calcium hydroxide and magnesium hydroxide, can be applied directly after opening if kept with seal in cans and plastic containers and the like in order not to evaporate water of slaked lime-based putty mixed previously with the addition of water. In both cases, any application methods can be adopted, for example trowel coating, spray coating, roller technique method and the like.

BEST MODE FOR CARRYING OUT THE INVENTION

The concrete examples and the effects of the production method by Examples according to the present invention will be described in the following and the present invention is not limited to Examples described below.

Hereupon, the slaked lime used in Examples is the plaster slaked lime which passes JIS A 6902 and the dolomite plaster is the dolomite plaster which passes JIS A 6903.

As the typical carrageenan, the lambda (λ) carrageenan is selected among the carrageenans comprising a six-membered-ring galactose skeleton and bonded thereto in equatorial conformation a sulfate group($-OSO_3^-$) and a hydroxyl group($-OH$).

Also, the slaked lime-based putty which is adjusted to a certain level of the standard softness index used by Vicat indentation tester which is specified in (JIS) R 5201 is used and water addition amount of the standard softness index is made for standard mixing water amount (%).

EXAMPLE 1

The slaked lime 100 weight parts, the lambda (λ) carrageenan (Manufactured by Nitta Gelatin Inc., Trade name; Nitta carrageenan L-1) 1.0 weight part, jute fibers for plastering(Manufactured by Matsuzaki kenzai Co.,LTD) 4 weight parts are uniformly blended and the putty which is kneaded with water is obtained. The standard water mixture is 88.1%. The putty shows no odor and pure white.

Regarding the adhesive strength to bases, after the diluted solution of ethylene-vinylacetate based copolymer emulsion (Manufactured by Murakashi Lime Industry Co.,LTD., Trade name; Fujiprimer, Solid parts;45%) with triple-quantity of fresh water, is coated by brush to the concrete panel as adhesive enforcement material, and then it is made sufficiently dry, subsequently the putty is coated in 2 mm thickness.

The putty is conducted to leave at rest and cure within a room, and then at $28^{th}$ day adhesive test is conducted using Building Research Institute adhesive test machine. At measurement, a fitment (adhesion area; 40 mm×40 mm) is adhered by quick drying epoxy resin and made notches to the four-side of the fitment by an electric power cutter and provided for testing. The workability is evaluated by sensuous test by towering coating(workability evaluation standard; ◎: excellent, ○: good, Δ: normal, ×: inferior).

Regarding water resistive test, after the above mentioned adhesive reinforcement material is coated to a mortar test specimen, the putty is coated in 2 mm thick after it is made sufficiently dry. After curing for one week, the specimen subsequently is immersed in water for one night (16 hours) and taken out to expose under the direct sun light for 8 hours, and is repeated to immerse in water again. The water resistive test result is described as the numbers of days until surface change is recognized. The result is shown in Table 1.

EXAMPLE 2

The slaked-lime 100 weight parts, the lambda (λ) carrageenan (Manufactured by Nitta Gelatin Inc., Trade name; Nitta carrageenan L-1) 2.0 weight parts, jute fibers for plastering(Manufactured by Matsuzaki kenzai Co.,LTD) 4 weight parts are uniformly blended and the putty which is kneaded with water is obtained. The standard water mixture is 93.1%. The putty shows no odor and pure white. The tests on adhesive strength, workability, water resistive properties are conducted in accordance with Example 1. The result is shown in Table 1.

EXAMPLE 3

The slaked-lime 100 weight parts, the lambda (λ) carrageenan (Manufactured by Nitta Gelatin Inc., Trade name; Nitta carrageenan L-1) 4.0 weight parts, jute fibers for plastering(Manufactured by Matsuzaki kenzai Co.,LTD) 4 weight parts are uniformly blended and the putty which is kneaded with water is obtained. The standard water mixture is 97.8%. The putty shows no odor and pure white. The tests on adhesive strength, workability, water resistive properties are conducted in accordance with Example 1. The result is shown in Table 1.

EXAMPLE 4

One portion of the putty prepared in Example 3 is sealed in a can, and the can is opened after one month, and then, the tests on adhesive strength and workability are conducted in accordance with Example 1. The result is shown in Table 1.

EXAMPLE 5

The dolomite plaster 100 weight parts, the lambda (λ) carrageenan (Manufactured by Nitta Gelatin Inc., Trade name; Nitta carrageenan L-1) 1.0 weight parts, jute fibers for plastering(Manufactured by Matsuzaki kenzai Co.,LTD) 5 weight parts are uniformly blended and the putty which is kneaded with water is obtained. The standard water mixture is 73.7%. The putty shows no odor and pure white. The tests on adhesive strength and workability are conducted in accordance with Example 1. The result is shown in Table 1.

EXAMPLE 6

The dolomite plaster 100 weight parts, the lambda (λ) carrageenan (Manufactured by Nitta Gelatin Inc., Trade name; Nitta carrageenan L-1) 2.0 weight parts, jute fibers for plastering(Manufactured by Matsuzaki kenzai Co.,LTD) 5 weight parts are uniformly blended and the putty which is kneaded with water is obtained. The standard water mixture is 84.0%. The putty shows no odor and pure white. The tests on adhesive strength and workability are conducted in accordance with Example 1. The result is shown in Table 1.

EXAMPLE 7

The dolomite plaster 100 weight parts, the lambda (λ) carrageenan (Manufactured by Nitta Gelatin Inc., Trade name; Nitta carrageenan L-1) 4.0 weight parts, jute fibers for plastering(Manufactured by Matsuzaki kenzai Co.,LTD) 5 weight parts are uniformly blended and the putty which is kneaded with water is obtained. The standard water mixture is 100.0%. The putty shows no odor and pure white. The tests on adhesive strength and workability are conducted in accordance with Example 1. The result is shown in Table 1.

COMPARATIVE EXAMPLE 1

In Comparative Example 1 the kappa (κ) carrageenan is selected as one of the typical carrageenans which gelates with metal ion.

To be more precise, the slaked-lime 100 weight parts, kappa (κ) carrageenan (Manufactured by MRC Polysaccaride Co.,LTD., Trade name; MW 351) 1.0 weight parts, jute fibers for plastering(Manufactured by Matsuzaki kenzai Co.,LTD) 4 weight parts are uniformly blended and the putty which is kneaded with water is obtained. The standard water mixture is 91.4%. The putty shows no odor and pure white, but soon after coating, crack is appeared on the surface. The adhesive strength after curing show tremendous low level compared with the lambda (λ) carrageenan used(Example 1). The tests on adhesive strength and workability are conducted in accordance with Example 1. The result is shown in Table 1.

COMPARATIVE EXAMPLE 2

The kappa (κ) carrageenan is used in accordance with Comparative Example 1. To be more precise, the slaked lime 100 weight parts, kappa (κ) carrageenan (Manufactured by MRC Polysaccaride Co.,LTD., Trade name; MW 351) 2.0 weight parts, jute fibers for plastering(Manufactured by Matsuzaki kenzai Co.,LTD) 4 weight parts are uniformly blended and the putty which is kneaded with water is obtained. The standard water mixture is 95.8%. The putty shows no odor and pure white, but soon after coating, crack is appeared on the surface. The adhesive strength after curing show remarkably low level compared with the lambda (λ) carrageenan used(Example 2). The tests on adhesive strength and workability are conducted in accordance with Example 1. The result is shown in Table 1.

COMPARATIVE EXAMPLE 3

The kappa (κ) carrageenan is used in accordance with Comparative Example 1. To be more precise, the slaked lime 100 weight parts, the kappa (κ) carrageenan (Manufactured by MRC Polysaccaride Co.,LTD., Trade name; MW 351) 4.0 weight parts, jute fibers for plastering (Manufactured by Matsuzaki kenzai Co.,LTD) 4 weight parts are uniformly blended and the putty which is kneaded with water is obtained. The standard water mixture is 106.0%. The putty shows no odor and pure white, but soon after plastering, crack is appeared on the surface. The adhesive strength after curing show remarkably low level compared with the lambda (λ) carrageenan used(Example 3). The tests on adhesive strength and workability are conducted in accordance with Example 1. The result is shown in Table 1.

COMPARATIVE EXAMPLE 4

The slaked lime 100 weight parts, powdered of dried red seaweeds 2.0 weight parts, jute fibers for plastering (Manufactured by Matsuzaki kenzai Co.,LTD) 4 weight parts are uniformly blended and the putty which is kneaded with water is obtained. The standard water mixture is 94.1%. The putty shows peculiar odor of red seaweeds and yellow family color is recognized. The adhesive strength after curing show tremendous low level compared with the lambda (λ) carrageenan used(Example 2). The tests on adhesive strength, workability, water resistive properties are conducted in accordance with Example 1. The result is shown in Table 1.

COMPARATIVE EXAMPLE 5

The slaked lime 100 weight parts, powdered of dried red seaweeds 640 g is put into 10L of water and dissolved by boiling to remove the insoluble material (solids content approximately 6.0%) 33 weight parts, jute fibers for plastering (Manufactured by Matsuzaki kenzai Co.,LTD) 4 weight parts are uniformly blended and the putty which is kneaded with water is obtained. The standard water mixture is 86.1%. The putty shows peculiar odor of red seaweeds and yellow family color is recognized. The adhesive strength after curing show significantly low level compared with the lambda (λ) carrageenan used(Example 2). The tests on adhesive strength, workability, water resistive properties are conducted in accordance with Example 1. The result is shown in Table 1.

COMPARATIVE EXAMPLE 6

The slaked lime 100 weight parts, methyl cellulose (Manufactured by Shin-Etsu Chemical Co.,LTD., Trade name; 90SH-4000)0.5 weight parts, jute fibers for plastering (Manufactured by Matsuzaki kenzai Co.,LTD) 4 weight parts are uniformly blended and the putty which is kneaded with water is obtained. The standard water mixture is 92.0%. Workability shows wrong trowel release properties and flat plastering with uniform thickness is difficult. The adhesive strength after curing is significantly low level. Regarding water resistive properties, after six days passed, cracking is generated to the test sample and partly peeling with base surface is recognized. The tests on adhesive strength, workability, and water resistive properties are conducted in accordance with Example 1. The result is shown in Table 1.

COMPARATIVE EXAMPLE 7

The slaked lime 100 weight parts, methyl cellulose (Manufactured by Shin-Etsu Chemical Co.,LTD., Trade name; 90SH-4000)1.0 weight parts, jute fibers for plastering (Manufactured by Matsuzaki kenzai Co.,LTD) 4 weight parts are uniformly blended and the putty which is kneaded with water is obtained. The standard water mixture is 94.1%. Workability shows wrong trowel release properties and flat plastering with uniform thickness is difficult. The adhesive strength after curing is significantly low level compared with the lambda (λ) carrageenan used (Example 1). The tests on adhesive strength and workability are conducted in accordance with Example 1. The result is shown in Table 1.

COMPARATIVE EXAMPLE 8

The slaked lime 100 weight parts, methyl cellulose (Manufactured by Shin-Etsu Chemical Co.,LTD., Trade name; 90SH-4000)2.0 weight parts, jute fibers for plastering (Manufactured by Matsuzaki kenzai Co.,LTD) 4 weight parts are uniformly blended and the putty which is kneaded with water is obtained. The standard water mixture is 98.0%. Workability shows wrong trowel release properties and flat plastering with uniform thickness is difficult. The adhesive strength after curing is significantly low level compared with the lambda (λ) carrageenan used (Example 2). The tests on adhesive strength and workability are conducted in accordance with Example 1. The result is shown in Table 1.

COMPARATIVE EXAMPLE 9

The plaster slaked lime 100 weight parts and jute fibers for plastering (Manufactured by Matsuzaki kenzai Co.,LTD) 4 weight parts are uniformly blended and the putty which is kneaded with water is obtained. The standard water mixture is 83.3%. The adhesive strength after curing is remarkably low level and can not be measured.

COMPARATIVE EXAMPLE 10

The dolomite plaster 100 weight parts and jute fibers for plastering (Manufactured by Matsuzaki kenzai Co.,LTD) 4 weight parts are uniformly blended and the putty which is kneaded with water is obtained. The standard water mixture is 70.0%. The adhesive strength after curing is significantly low level.

As shown in Table 1, the slaked lime-based plastering material composition according to the present invention has excellent workability properties, and revelation of strength after curing, adhesive properties with bases and water resistive properties are also satisfactory and excellent as the slaked lime-based coating material. Also, the slaked lime-based plastering material according to the present invention when in use, can apply either by mixing with the addition of water, or by the material which is kept previously mixed with the addition of water. Moreover, the carrageenans applied for foods is used so that safety is extremely in high level.

Meanwhile, in case that the kappa (κ) carrageenan which has properties of gelation by metal ion is used(Comparative Example 1, Comparative Example 2 and Comparative Example 3), cracks on the surface are appeared soon after coating and the adhesive strength after curing is significantly low. In case that red seaweeds solutions which are prepared by boiling and dissolving of the powdere of dried red seaweeds and dried red seaweeds are used(Comparative Example 4 and Comparative Example 5), no problem on water resistive and workability properties is acknowledged, but the plastering material is poor in strength increase and have peculiar odor of red seaweeds which causes problem while at work as well as yellow family coloration is recognized. When methyl cellulose is used (Comparative Example 6, Comparative Example 7 and Comparative Example 8),no odor is recognized but in the water resistive test, cracks on surface of sample and delamination with base material surface are recognized. Regarding workability, trowel extension properties are excellent, but since excessive high stickiness properties provide inferior trowel release, plastering in uniform thickness smoothly is difficult. In case that no water holding material is added (Comparative Example 9 and Comparative Example 10), the adhesive strengths in both cases are in low level.

The lambda (λ) carrageenan, which is the typical carrageenan which does not gelate by metal ion, is selected and conducted in Examples, but even any other types of carrageenans according to Claims are obtained with the similar results.

Since the carrageenans according to the present invention are water soluble natural polysaccharide, in case of mixing with the slaked lime-based and kneading with water, the carrageenans quickly dissolve and also have excellent water holding and viscosity control properties which make low water absorption when coating to walls, so that the carrageenans have a feature of workability improvement.

Also, because of being state in the powder, the carrageenans can be made as the ready mixed product with the slaked lime-based so that the quality can be kept in certain level, and when in use, because of merely adding water and kneading only, convenience is excellent, accordingly the carrageenans can create efficiency in many aspects.

Moreover, the slaked lime-based coating material composition have excellent storage stability, and the putty can leave after kneading, and the slaked lime-based coating material composition have no specific odor or coloration as the natural seaweeds, and using as the slaked lime-based plastering material composition makes the increase of whiteness and applicable. No need to say that carrageenans are used for food application in a long period of time so that the safety is in high level.

INDUSTRIAL APPLICABILITY

The slaked lime-based plastering material composition, according to the present invention is the slaked lime-based plastering material composition, which gives a consideration to sick house syndrome is a powdery composition obtained by mixing either calcium hydroxide or a calcium hydroxide/magnesium hydroxide mixture with one or more carrageenans comprising a six-membered-ring galactose skeleton and bonded thereto in equatorial conformation a sulfate group ($-OSO_3^-$) and a hydroxyl group($-OH$) and which is kneaded together with water at time of use, or is the slaked-lime based plastering material composition which gives a consideration to sick house syndrome is a pasty slaked lime-based plastering material composition obtained by mixing either calcium hydroxide or a calcium hydroxide/magnesium hydroxide mixture with one or more carrageenans comprising a six-membered-ring galactose skeleton and bonded thereto in equatorial conformation a sulfate group ($-OSO_3^-$) and a hydroxyl group($-OH$), and which is kneaded together in advance, and said carrageenan has been utilized for a long time in food applications and is highly safe and, moreover, said carrageenan is a water-soluble natural polysaccharide, and rapidly dissolves upon mixing with slaked lime and kneading with water and further has excellent water retention and, hence, is difficult to be water-absorbed to bases of walls and the like, so that adhesive properties, workability and water resistive properties to the bases are improved, and the industrial application values are in high level.

Also, the powdery slaked lime-based plastering material composition according to the present invention can be made as the ready mixed product so that the quality can be kept in certain level, and when in use, because of merely adding water and kneading only, convenience is excellent, accordingly the powdery slaked lime-based plastering material composition can create efficiency in many aspects.

Moreover, the slaked lime-based plastering material composition according to the present invention has excellent storage stability, and the putty can leave after kneading, and the slaked lime-based plastering material composition have no specific odor or colorinaiton as natural seaweeds are used, using as the slaked lime-based coating material composition makes the increase of whiteness and applicable.

TABLE 1

|  | Adhesive Strength (kN) | Water Resistive Properties Test | Workability (Sensuous Test) |
|---|---|---|---|
| Example 1 | 1.70 | 30 days and more | ○ |
| Example 2 | 2.40 | 30 days and more | ◎ |
| Example 3 | 2.50 | 30 days and more | ◎ |
| Example 4 | 2.48 | 30 days and more | ◎ |
| Example 5 | 1.45 | 30 days and more | ◎ |

TABLE 1-continued

|  | Adhesive Strength (kN) | Water Resistive Properties Test | Workability (Sensuous Test) |
|---|---|---|---|
| Example 6 | 1.62 | 30 days and more | ◎ |
| Example 7 | 1.88 | 30 days and more | ◎ |
| Comparative Example 1 | 0.59 | — | X |
| Comparative Example 2 | 0.58 | — | X |
| Comparative Example 3 | 0.51 | — | X |
| Comparative Example 4 | 1.32 | 30 days and more | ○ |
| Comparative Example 5 | 1.71 | 30 days and more | ○ |
| Comparative Example 6 | 0.61 | Six days (Cracking, partially delamination with base surface) | Δ |
| Comparative Example 7 | 0.97 | Six days (Cracking, partially delamination with base surface) | X |
| Comparative Example 8 | 1.43 | Six days (Cracking, partially delamination with base surface) | X |
| Comparative Example 9 | Unmeasurable | — | X |
| Comparative Example 10 | 0.55 | — | Δ |

The invention claimed is:

1. A slaked lime-based plastering material composition comprising a powdery composition obtained by mixing a calcium hydroxide or a mixture of calcium hydroxide and magnesium hydroxide with one or more carrageenans having a six-membered-ring galactose skeleton and bonded thereto in equatorial conformation a sulfate group($-OSO_3^-$) and a hydroxyl group($-OH$) and being kneaded together with water at time of use.

2. The slaked lime-based plastering material composition according to claim 1, wherein the carrageenan having a six-membered-ring galactose skeleton and bonded thereto in equatorial conformation a sulfate group($-OSO_3^-$) and a hydroxyl group($-OH$) is lambda($\lambda$)carrageenan, mu($\mu$)carrageenan, nu($\nu$) carrageenan, xi($\xi$)carrageenan, pi($\pi$)carrageenan, or theta($\theta$)carrageenan.

3. The method of using the slaked lime-based plastering material composition according to claim 2, as plaster material.

4. The slaked lime-based plastering material composition according to claim 1, wherein said carrageenan of 0.1~5.0 parts by weight is added to calcium hydroxide or a mixture of calcium hydroxide and magnesium hydroxide of 100 parts by weight.

5. The method of using the slaked lime-based plastering material composition according to claim 4, as plaster material.

6. The slaked lime-based plastering material composition according to claim 1, wherein the slaked-lime is applied for the calcium hydroxide and dolomite plaster or hydrated dolomitic lime is applied for the mixture of calcium hydroxide and magnesium hydroxide.

7. The method of using the slaked lime-based plastering material composition according to claim 6, as plaster material.

8. The slaked lime-based plastering material composition according to claim 1, wherein at least one material selected from a hydraulic composition, plaster admixture agent, or aggregate is compounded.

9. The method of using the slaked lime-based plastering material composition according to claim 8, as plaster material.

10. The method of using the slaked lime-based plastering material composition according to claim 1, as plaster material.

11. A slaked lime-based plastering material composition comprising a powdery composition obtained by mixing a calcium hydroxide or a mixture of calcium hydroxide and magnesium hydroxide with one or more carrageenans having a six-membered-ring galactose skeleton and bonded thereto in equatorial conformation a sulfate group($-OSO_3^-$) and a hydroxyl group($-OH$), and being kneaded together with water in advance.

12. The slaked lime-based plastering material composition according to claim 11, wherein:

the carrageenan having a six-membered-ring galactose skeleton and bonded thereto in equatorial conformation a sulfate group($-OSO_3^-$) and a hydroxyl group($-OH$) is lambda($\lambda$)carrageenan, mu($\mu$)carrageenan, nu($\nu$) carrageenan, xi($\xi$)carrageenan, pi($\pi$)carrageenan, or theta($\theta$)carrageenan;

said carrageenan of 0.1~5.0 parts by weight is added to calcium hydroxide or a mixture of calcium hydroxide and magnesium hydroxide of 100 parts by weight;

the slaked-lime is applied for the calcium hydroxide and dolomite plaster or hydrated dolomitic lime is applied for the mixture of calcium hydroxide and magnesium hydroxide;

at least one material selected from hydraulic composition, plaster admixture agent, or aggregate is compounded.

13. The method of using the slaked lime-based plastering material composition according to claim 12, as plaster material.

14. The method of using the slaked lime-based plastering material composition according to claim 11, as plaster material.

* * * * *

UNITED STATES PATENT AND TRADEMARK OFFICE
CERTIFICATE OF CORRECTION

PATENT NO.       : 7,276,116 B2
APPLICATION NO.  : 10/530230
DATED            : October 2, 2007
INVENTOR(S)      : Teruo Urano et al.

It is certified that error appears in the above-identified patent and that said Letters Patent is hereby corrected as shown below:

Column 8, line 47, "nu (µ)" should read --nu (υ)--.

Signed and Sealed this

Sixth Day of May, 2008

JON W. DUDAS
*Director of the United States Patent and Trademark Office*